United States Patent
Yoshie et al.

(10) Patent No.: US 7,136,674 B2
(45) Date of Patent: Nov. 14, 2006

(54) CONTROL ADAPTER DEVICE

(75) Inventors: Hiroto Yoshie, Atsugi (JP); Yutaka Tanaka, Atsugi (JP)

(73) Assignees: Mitsumi Electric Co., Ltd., Tokyo (JP); Nintendo Co., Ltd., Kyoto (JP)

( * ) Notice: Subject to any disclaimer, the term of this patent is extended or adjusted under 35 U.S.C. 154(b) by 444 days.

(21) Appl. No.: 10/786,944

(22) Filed: Feb. 25, 2004

(65) Prior Publication Data

US 2004/0185903 A1    Sep. 23, 2004

(30) Foreign Application Priority Data

Mar. 19, 2003  (JP)  ............... 2003-076506

(51) Int. Cl.
*H04B 1/38*  (2006.01)
(52) U.S. Cl. .............. 455/557; 455/344; 463/37; 463/39
(58) Field of Classification Search .......... 455/344, 455/347, 348, 349, 351, 575.1, 575.6, 90.3, 455/557; 463/36, 37, 38, 39
See application file for complete search history.

(56) References Cited

U.S. PATENT DOCUMENTS

| | | | |
|---|---|---|---|
| 4,702,542 A | | 10/1987 | Noyes |
| 5,472,351 A | | 12/1995 | Greco et al. |
| 5,853,326 A | * | 12/1998 | Goto et al. .............. 463/37 |
| 5,897,437 A | * | 4/1999 | Nishiumi et al. ......... 463/47 |
| 6,171,191 B1 | * | 1/2001 | Ogata et al. ............. 463/38 |
| 6,234,828 B1 | | 5/2001 | Kuo |
| 6,641,479 B1 | * | 11/2003 | Ogata et al. ............. 463/37 |
| 2003/0003993 A1 | | 1/2003 | Leifer et al. |

FOREIGN PATENT DOCUMENTS

| | | |
|---|---|---|
| DE | 1720861 | 4/1956 |
| EP | 0680155 | 11/1995 |
| JP | 2002-073259 | 3/2002 |

* cited by examiner

*Primary Examiner*—Quochien B. Vuong
(74) *Attorney, Agent, or Firm*—Ladas & Parry LLP (57) ABSTRACT

A control adapter device for attaching to a control unit having an input control part is disclosed. The control adapter device includes a connector for electrically connecting the control adapter device to the control unit, a transmission part for transmitting, by wireless transmission, a signal that is input from the input control part, a case supporting the connector and containing the transmission part therein, an engagement member being supported by a shaft in the case for rotatable movement between an engagement position and a disengagement position, the engagement member being formed to engage the control unit, and including a press-maneuver part for receiving a pressing force to thereby rotate the engagement member, and a restriction member being disposed in the case to block movement of the press maneuver part of the engagement member, and thereby restrict movement of the engagement member beyond the disengagement position.

3 Claims, 9 Drawing Sheets

CONTROL ADAPTER DEVICE

BACKGROUND OF THE INVENTION

1. Field of the Invention

The present invention generally relates to a control adapter device, and more particularly to a control adapter device to be attached to a control unit having an input control part.

2. Description of the Related Art

As for a control unit including an input control part for allowing the user to execute an inputting maneuver (input control), there are, for example, a keyboard of a personal computer, a controller for a television game machine, and a control part used in controlling computer-controlled conveying machines or industrial robots.

These types of control units are able to conduct wireless transmission of signals by attaching thereto a control adapter device including a transmission part using, for example, electric waves, infrared rays, and/or light. A conventional example is shown in Japanese Laid-Open Patent Application No. 2002-73259.

The control adapter device is provided with an engagement mechanism for engagement with a wall face of the control unit. The engagement mechanism is attached to the control unit in a manner that the engagement mechanism can separate from the wall face of the control unit when an engagement lever of the engagement mechanism is pressed in an engagement disengaging direction (direction disengaging the control adapter device from the control unit).

There is a growing demand for a size-reduced and lightweight control adapter device that is to be mounted to the control unit in the aforementioned manner. For example, the control adapter device may have an antenna or a substrate including a transmission circuit installed inside of its case. Furthermore, the control adapter device may also have a connector or an engagement mechanism disposed in a space surrounding the substrate.

In order to enable the engagement lever of the engagement mechanism to rotatably move such that the engagement lever will not contact the substrate or the connector, a stopper for restricting the angle of rotation of the rotating engagement lever is arranged at the fulcrum of the rotating engagement lever. The stopper, in the form of a cylindrical rib, has a step portion that is disposed in the vicinity of the rotation center so that the step portion is contacted by the engagement lever to thereby restrict the rotation angle of the engagement lever.

The engagement lever, being a resin molded component, may lack strength and be susceptible to deformation when the radial thickness of the engagement lever is uniformly formed for improving moldability.

Therefore, when a pressing force is applied to a press-maneuver part for rotatively moving the engagement lever to the engagement disengaging direction, the engagement lever deforms (bends) when the engagement lever contacts the step portion of the cylindrical rib (stopper) formed in the periphery of the rotation center, and adversely affects the maneuvering feel of the press-maneuver part.

SUMMARY OF THE INVENTION

It is a general object of the present invention to provide a control adapter device that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a control adapter device particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a control adapter device for attaching to a control unit having an input control part, the control adapter device including: a connector for electrically connecting the control adapter device to the control unit; a transmission part for transmitting, by wireless transmission, a signal that is input from the input control part; a case supporting the connector and containing the transmission part therein; an engagement member being supported by a shaft in the case for rotatable movement between an engagement position and a disengagement position, the engagement member being formed to engage the control unit, and including a press-maneuver part for receiving a pressing force to thereby rotate the engagement member; and a restriction member being disposed in the case to block movement of the press maneuver part of the engagement member, and thereby restrict movement of the engagement member beyond the disengagement position. According to an embodiment of the present invention, the restriction member may be situated at the vicinity of a line along which the pressing force of the press-maneuver part is directed. According to an aspect of the invention, the engagement member will not deform during an engagement disengaging maneuver, and a satisfactory feel can be obtained during the engagement disengaging maneuver.

According to an embodiment of the present invention, the restriction member may be situated at the vicinity of a line along which the pressing force of the press-maneuver part is directed. According to an aspect of the invention, the engagement member will not deform during an engagement disengaging maneuver, and a satisfactory feel can be obtained during the engagement disengaging maneuver.

According to an embodiment of the present invention, the press-maneuver part may have a groove portion in which a surface thereof comes into contact with the restriction member, and which groove portion has a shape corresponding to the shape of the restriction member. According to an aspect of the invention, the engagement member will not deform during an engagement disengaging maneuver, and a satisfactory feel can be obtained during the engagement disengaging maneuver.

Other objects and further features of the present invention will be apparent from the following detailed description when read in conjunction with the accompanying drawings.

BRIEF DESCRIPTION OF THE DRAWINGS

FIGS. 2A through 2D are external views showing a structure of a control adapter device according to an embodiment of the present invention in which

DESCRIPTION OF THE PREFERRED EMBODIMENTS

In the following, embodiments of the present invention are described with reference to the accompanying drawings.

Figure 1:
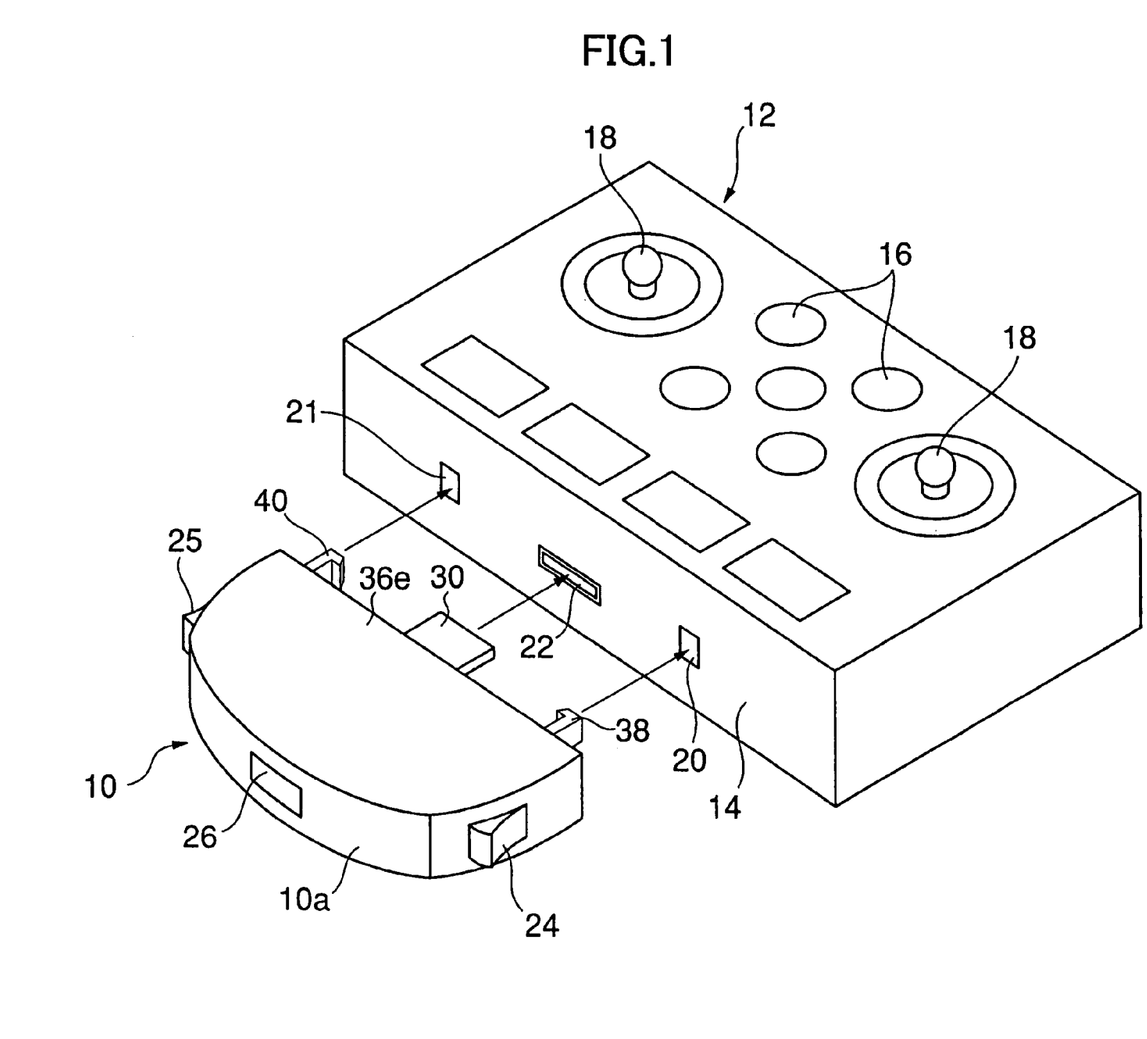
FIG. 1 is a perspective view showing a mounting operation of a control adapter device 10 according to an embodiment of the present invention.

FIG. 1 is a perspective view showing an attachment operation of a control adapter device 10 according to an embodiment of the present invention.

In FIG. 1, the control adapter device 10 is detachably attached to a casing wall 14 of a control unit 12. An input control part including, for example, plural control buttons 16 and a control lever 18 is situated at the top surface of the control unit 12. It is to be noted that the control unit 12 may be, for example, a keyboard of a personal computer, a controller of a television game machine, or a control part for controlling a computer controlled conveying machine or an industrial robot.

The casing wall 14 includes a pair of engagement holes 20, 21, which receive an engagement mechanism 54 (described below), and a receiving connector 22. The control adapter device 10 is detachably attached to the casing wall 14 of the control unit 12 via the engagement holes 20, 22 and the receiving connector 22.

Press-maneuver parts 24, 25 for controlling engagement and disengagement are disposed at and protrude from each side of the control adapter device 10. A transmission part 26 for conducting wireless transmission of signals is disposed at a case-front end 10a of the control adapter device 10.

Thus structured, when the user depresses the control button 16 or maneuvers the control lever 18 of the control unit 12, a signal corresponding to such movements is transmitted by wireless transmission via the transmission part 26.

Accordingly, the user is able to switch the transmission type from a wire type to a wireless type by attaching the control adapter device 10 to the control unit 12.

The structure of the control adapter device 10 is next described.

Figure 2A:
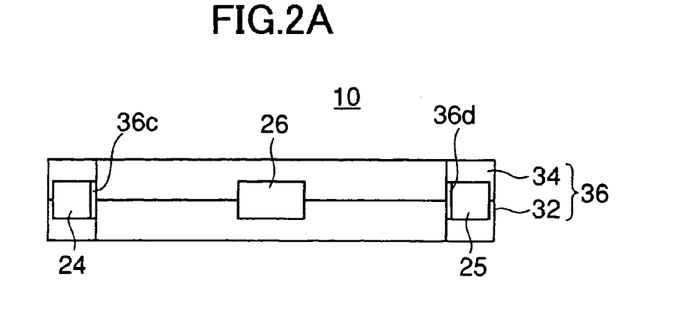
FIG. 2A is a front view.
Figure 2B:
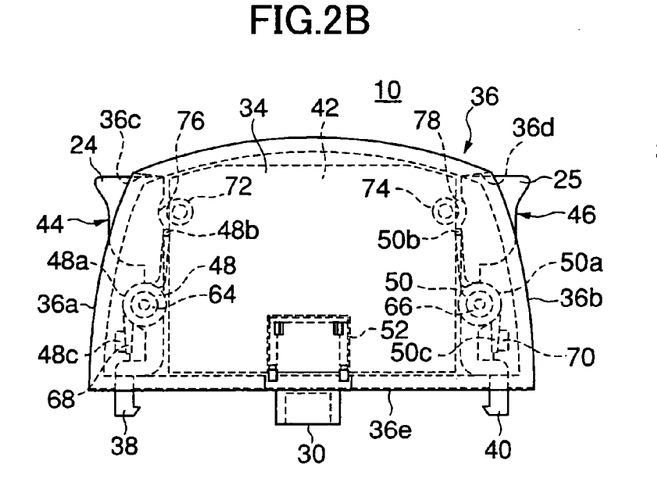
FIG. 2B is a plane view.
Figure 2C:
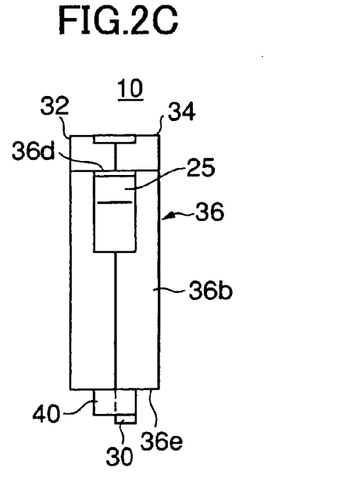
FIG. 2C is a side view.
Figure 2D:
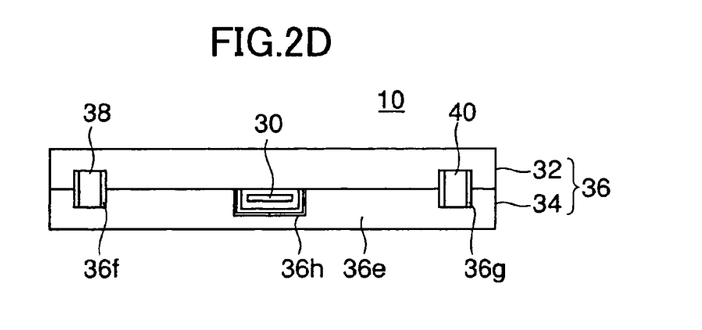
FIG. 2D is a rear view.

FIGS. 2A through 2D are exterior views of the structure of the control adapter 10, in which FIG. 2A is a front view, FIG. 2B is a plan view, FIG. 2C is a side view, and FIG. 2D is a rear view.

As shown in FIGS. 2A through 2D, the control adapter 10 includes a case main body 36, formed from a combination of an upper case 32 and a lower case 34. Openings 36c, 36d for allowing the press-maneuver parts 24, 25 to be inserted therethrough are formed on a left side surface 36a and a right side surface 36b of the case main body 36, respectively. Openings 36f, 36g, 36h for allowing engagement claws 38, 40, and an inserting connector 30, respectively to be inserted therethrough are formed in a rear surface 36e of the case main body 36.

The substrate 42, to which the inserting connector 30 is attached, is installed inside the case main body 36. Engagement mechanisms 54 (See FIG. 3) for engaging the control unit 12 with the control adapter device 10 are disposed at the left and right sides of the substrate 42.

The inserting connector 30 is disposed in a rearwardly protruding manner at the center portion of the rear surface 36e.

Figure 3:
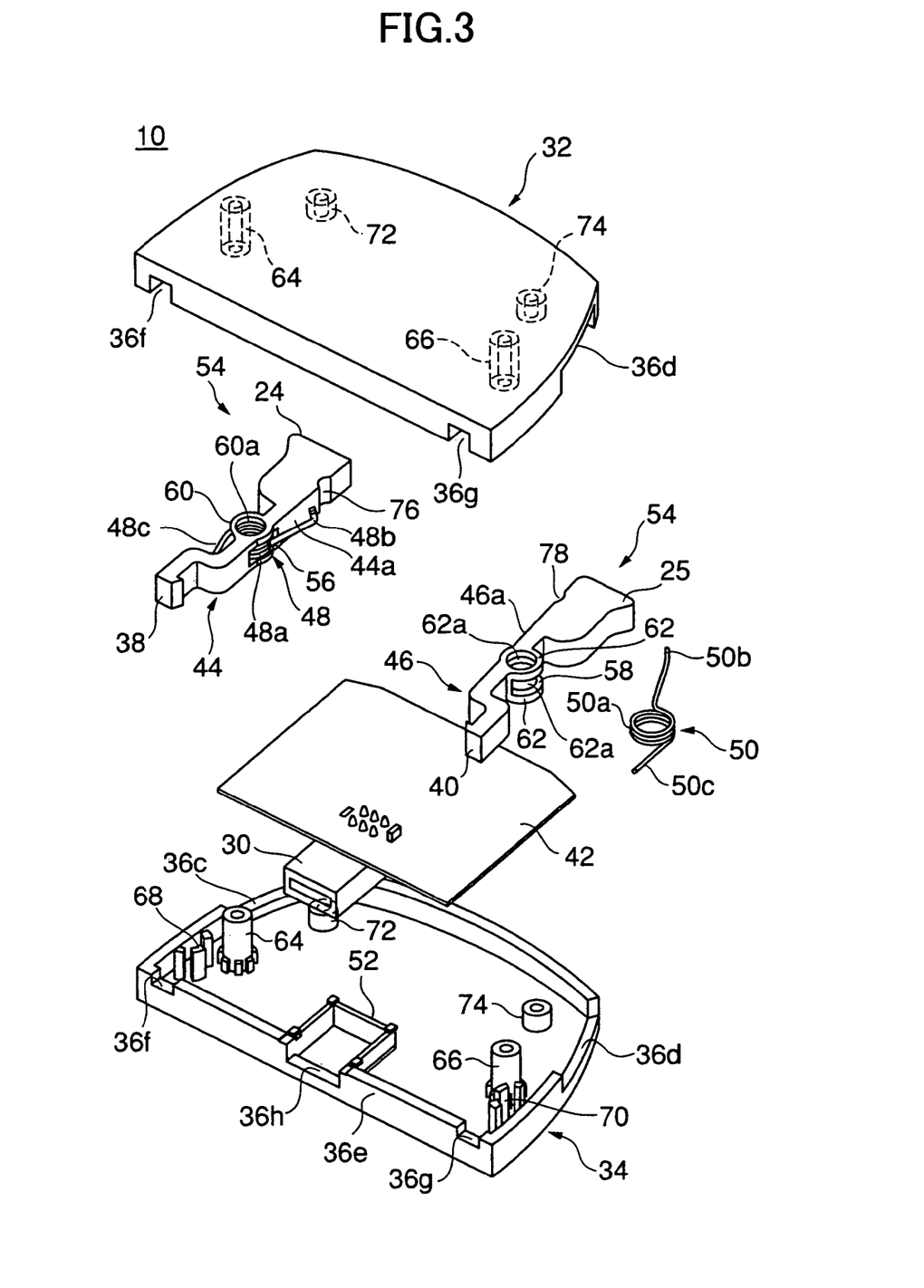
FIG. 3 is an exploded perspective view showing the structure of a control adapter device according to an embodiment of the present invention.
Figure 4:
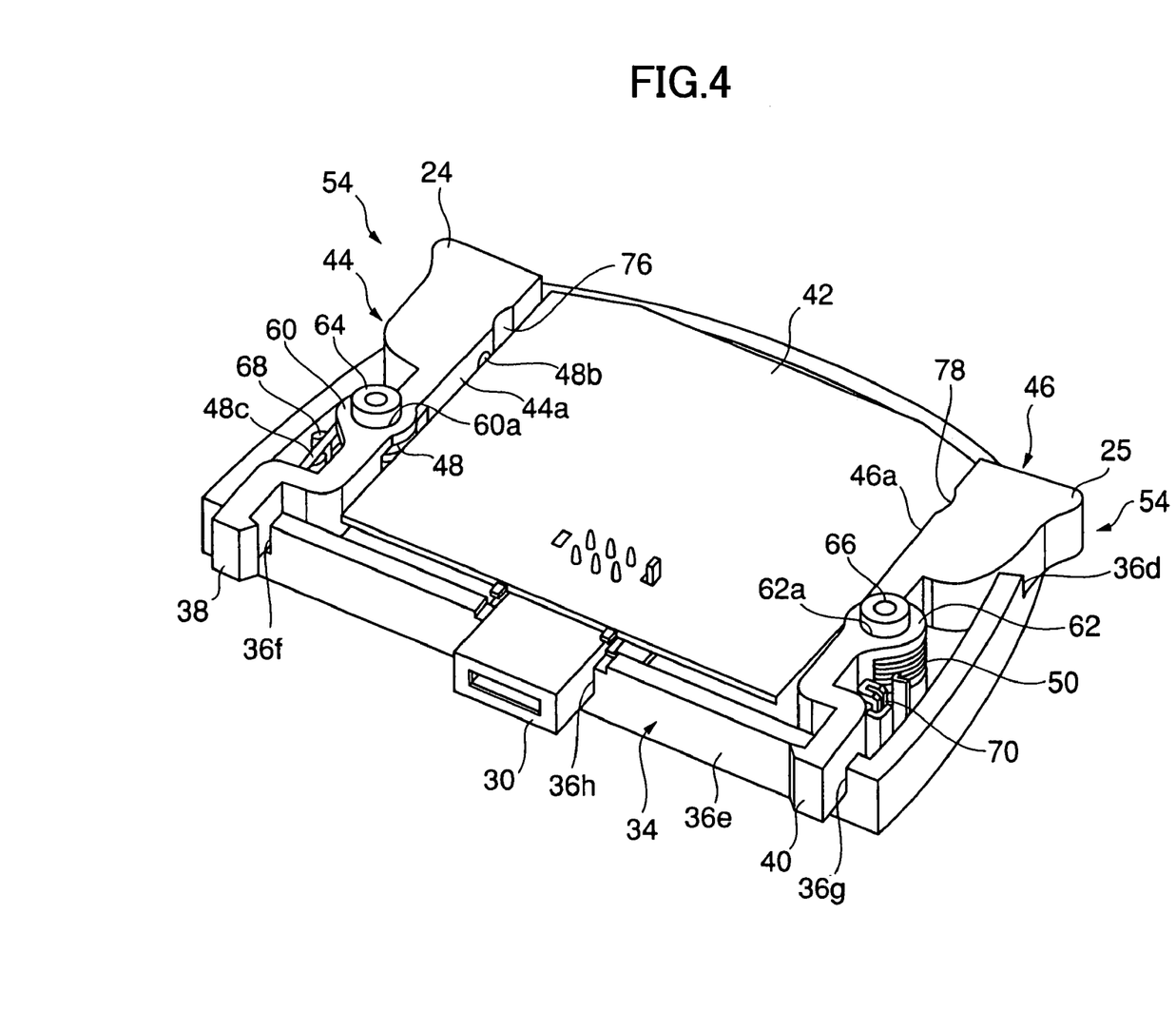
FIG. 4 is a perspective view showing an assembled state of the control adapter device of FIG. 3 where an upper case 32 is removed according to an embodiment of the present invention.

FIG. 3 is an exploded perspective view showing the structure of the control adapter device 10. FIG. 4 is a perspective view showing an assembled state where the upper case 32 is removed.

As shown in FIGS. 3 and 4, the control adapter device 10 contains and/or supports therein: the substrate 42 having a transmission circuit (not shown) disposed in the space created by the upper case 32 and the lower case 34; engagement levers 44, 46 disposed at left and right sides, respectively, of the substrate 42; and torsion springs 48, 50 biasing the engagement levers 44, 46, respectively, in engagement directions.

The inserting connector 30 is connected, as by soldering, to a rear portion of the lower surface of the substrate 42. Respective electronic components forming a transmission circuit and a transmission antenna (not shown) are disposed at a rear portion of the upper surface of the substrate 42. The substrate 42, in a state in which the inserting connector 30 is inserted into a quadrangular connector installment wall portion 52, is sandwiched between the upper case 32 and the lower case 34.

The engagement mechanisms 54 comprise the engagement levers 44, 46 and the torsion springs 48, 50, respectively. In the illustrated exemplary embodiment, the engagement levers 44, 46 are disposed on the left and right in a symmetrical manner. The engagement levers 44, 46 include the respective press-maneuver parts 24, 25 at one end thereof, and respective engagement claws 38, 40 at the other end thereof.

Groove portions 56, 58 into which coil portions 48a, 50a of the torsion springs 48, 50 are installed, are provided at midsections (in the longitudinal direction) of the engagement levers 44, 46, respectively. Furthermore, rotative support portions 60, 62 are arranged above and below the groove portions 56, 58, respectively. The rotative support portions 60, 62 are formed with round-shaped holes 60a, 62a for inserting therethrough shafts 64, 66, respectively, uprightly formed at the inner surfaces of the upper case 32, and the lower case 34. Thus structured, the engagement levers 44, 46 rotate about the shafts 64, 66 (being engaged at the rotative support portions 60, 62) with the shafts 64, 66 serving as their rotating centers.

The engagement levers 44, 46 also have arcuate groove portions 76, 78 that make contact against below-described stoppers (restriction members) 72, 74, respectively. The arcuate groove portions 76, 78 are disposed at the inwardly facing side surfaces 44a, 46a situated at the rear side (inner side) of the press-maneuver parts 24, 25 of the engagement levers 44, 46. Furthermore, the arcuate groove portions 76, 78 are situated at the proximity of a line (line of action) along which the pressing forces of the press-maneuver parts 24, 25 are directed.

Accordingly, the stoppers 72, 74 are subjected to the pressing forces of the press-maneuver parts 24, 25 at the proximity of the line of action. Therefore, in a case where the engagement levers 44, 46 are rotated in a direction for disengaging (releasing) engagement, the stoppers 72, 74 restrict the rotation of the engagement levers 44, 46 by making contact against the arcuate groove portions 76, 78, respectively. In such a case, the engagement levers 44, 46 are positively restricted from rotating without being bent since the stoppers 72, 74 are situated at the proximity of the line along which the pressing forces upon the press-maneuver parts 24, 25 are directed.

The torsion springs 48, 50 are attached to the engagement levers 44, 46 in a manner so that coil portions 48a, 50a are housed in the groove portions 56, 58, respectively, of the engagement levers 44, 46. In addition, since the torsion springs 48, 50 are coiled around the outer periphery of the shafts 64, 66, the torsion springs 48, 50 are attached to the engagement levers 44, 46 in a compact (space-saving) manner.

Other than the aforementioned shafts 64, 66, the inner surfaces of the upper and lower cases 32, 34 are provided with spring retaining portions 68, 70, and column-shaped stoppers 72, 74, respectively, for restricting the rotational movement of the engagement levers 44, 46.

Figure 5:
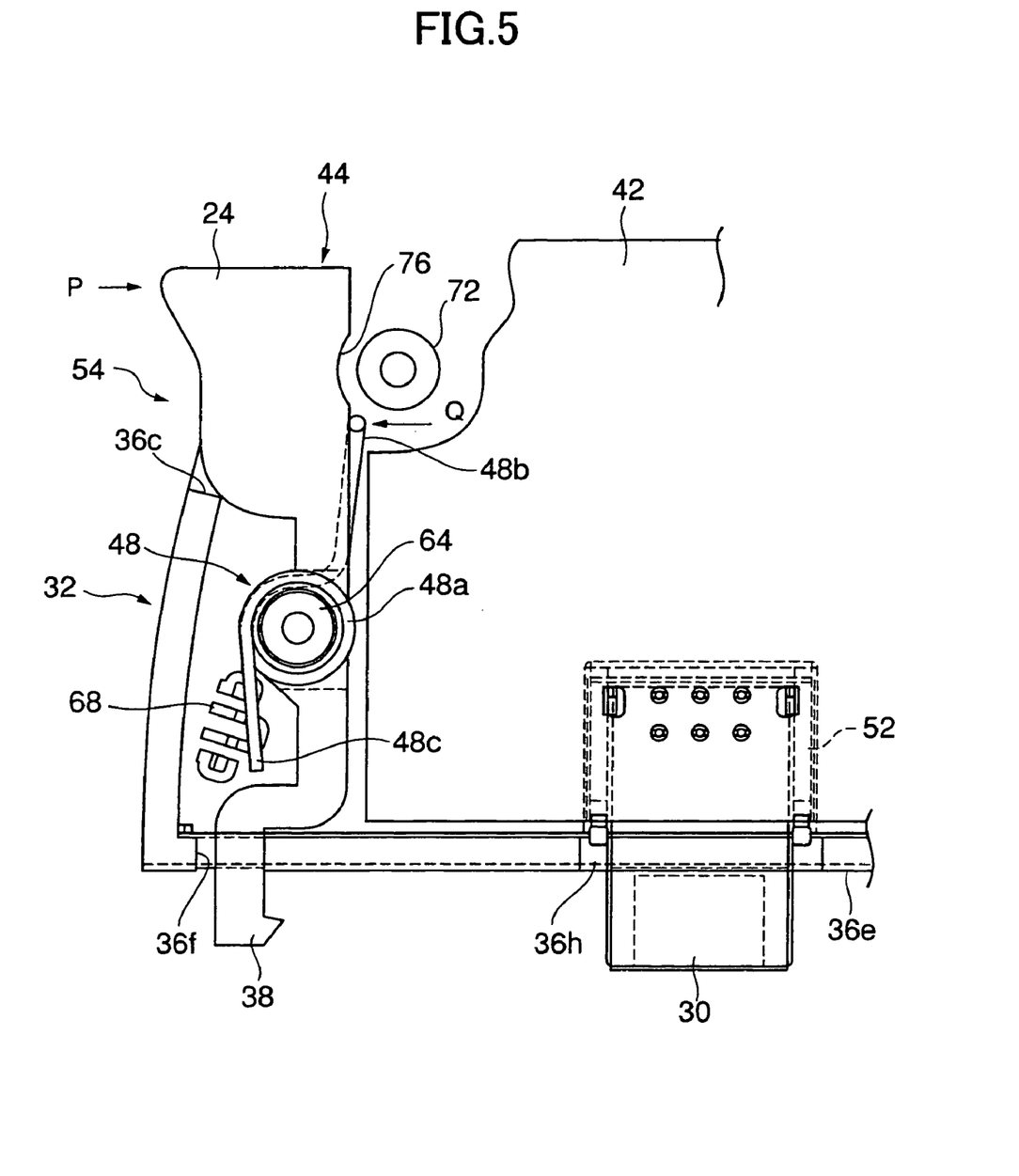
FIG. 5 is an enlarged plan view showing an attachment structure of an engagement lever 44 and a torsion spring 48 of FIG. 3 according to an embodiment of the present invention.

FIG. 5 is an enlarged plan view for explaining an attachment structure of the engagement lever 44 and the torsion spring 48 (For convenience, only one side of the attachment structure is shown).

As shown in FIG. 5, one end portion 48b(50b) of the torsion spring 48 (50), extending substantially in a radially outward direction from the coil portion 48a (50a), is inserted through an opening part of the groove portion 56 (58), to thereby allow the torsion spring 48 (50) to contact against the inwardly facing side surface 44a (46a) of the engagement lever 44 (46). The other end portion 48c (50c) of the torsion spring 48 (50), extending substantially in a radially outward direction from the coil portion 48a (50a), is retained by the spring retaining portions 68 (70) provided upright on the inner surface of the upper case 32 and the lower case 34.

The one end portion 48b (50b) of the torsion spring 48 (50) presses against the inwardly facing side surface 44a (46a) situated at the rear side (inner side) of the press-maneuver parts 24 (25) of the engagement levers 44 (46).

A pressure point P in the press-maneuver parts 24 (25) at which is applied a pressing force when the user pushes (rotates) the engagement lever 44 (46) in the engagement disengaging direction, is located in the vicinity of pressure point Q, at which is applied with a biasing force by spring contact from the one end 48b (50b) of the torsion spring 48 (50).

Accordingly, owing to the biasing force of the spring at the pressure point Q, the one end 48b (50b) of the torsion spring 48 (50), pressing the side surface 44a (46a) situated on the rear side of the press-maneuver part 24 (25), resists the engagement disengaging force of the user, and exerts a biasing force against the press-maneuver part 24 (25).

It is to be noted that in an exemplary embodiment of the present invention, the engagement lever 44 (46) is a resin mold member, and is relatively susceptible to elastic deformation in order to make uniform the radial thickness thereof. It may be considered that the engagement lever 44 (46) would bend during depression of the press-maneuver part 24 (25) since the distance from the shaft 64 (66) to the press-maneuver part 24 (25) is relatively long.

However, according to this embodiment of the present invention, the engagement lever 44 (46) can be rotated with hardly any bending since the press-maneuver part 24 (25) is pressed in the vicinity of the pressure point Q by the one end portion 48b (50b) of the torsion spring 48 (50). Moreover, a steady and satisfactory pressing feel can be obtained when pressing the press-maneuver part 24 (25).

Next, the operation of the engagement mechanism 54 and the mounting operation of the control adapter device 10 are described.

Figure 6:
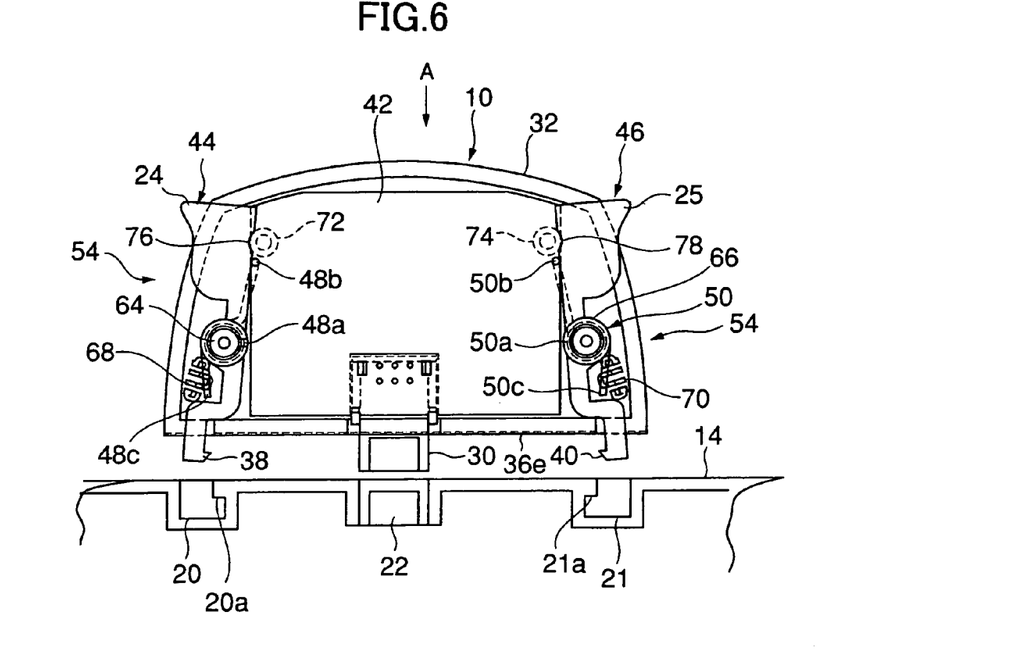
FIG. 6 is a side cross-sectional view showing a state before mounting a control adapter device 10 according to an embodiment of the present invention.

FIG. 6 is a side cross-sectional view showing a state before mounting the control adapter device 10.

As shown in FIG. 6, in mounting the control adapter 10 to the control unit 12, the press-maneuver parts 24, 25 are pressed from both left and right sides as in a squeezing manner. As a result, the engagement levers 44, 46 rotate in the engagement disengaging directions having the shafts 64, 66 serve as their respective centers.

The engagement levers 44, 46, which are biased against rotation by resisting the spring force of the torsion springs 48, 50, can be rotated by overcoming the spring force, to a position where the arcuate groove portions 76, 78 make contact against the stoppers 72, 74. In such an operation, the engagement levers 44, 46 can be prevented from deforming (bending), and a satisfactory pressing feel can be obtained during an engagement disengaging maneuver, since the stoppers 72, 74 are situated in the vicinity of the line along which the pressing forces upon the press-maneuver parts 24, 25 are directed.

Pressing the press-maneuver parts 24, 25 in the aforedescribed manner, allows the engagement claws 38, 40 disposed at the tips of the engagement levers 44, 46, to be in a position ready for insertion into the engagement holes 20, 21, respectively, provided in the casing wall 14 of the control unit 12. The user aligns the engagement claws 38, 40 with the engagement holes 20, 21, which also positions the inserting connector 30 in a manner facing the receiving connector 22.

Subsequently, the user moves the control adapter device 10 toward the control unit 12 in direction A, thereby inserting the engagement claws 38, 40 into the engagement holes 20, 21, respectively, and the inserting connector 30 into the receiving connector 22.

Figure 7:
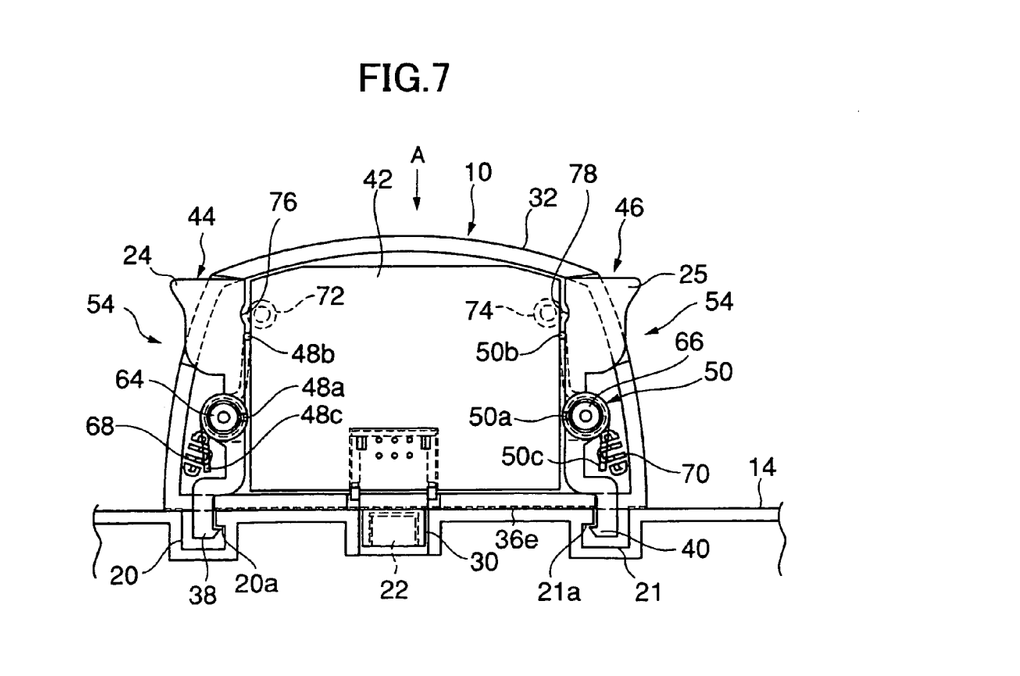
FIG. 7 is a side cross-sectional view showing a state after mounting the control adapter device 10 according to an embodiment of the present invention.

FIG. 7 is a side cross-sectional view showing a state after mounting the control adapter device 10 to the control unit 12. As shown in FIG. 7, when the rear surface 36e of the control adapter device 10 contacts the casing wall 14 of the control unit 12, the user can withdraw the force against the press-maneuver parts 24, 25. As a result, the biasing forces of the torsion springs 48, 50 urge the engagement levers 44, 46 to return to engaged positions.

Thus structured, the engagement claws 38, 40, disposed on the tips of the engagement levers 44, 46 contact in a lateral direction and engage groove portions 20a, 21a of the casing wall 14 that form part of the engagement holes 20, 21, respectively. Accordingly, by executing the foregoing engagement procedure, the control adapter 10 is attached to the casing wall 14 of the control unit 12 where the inserting connector 30 is engaged to the receiving connector 22.

Accordingly, the user presses the press-maneuver parts 24, 25, and then, while having the engagement mechanisms 54 in the engagement disengaged (released) state, the user inserts the engagement claws 38, 40 into the engagement holes 20, 21, while inserting the inserting connector 30 into the receiving connector 22. Then, by releasing the pressing force on the press-maneuver parts 24, 25, the mounting operation of the control adapter device 10 is completed.

In detaching the mounted control adapter device 10 from the control unit 12, the press-maneuver parts 24, 25 are pressed for separating the engagement claws 38, 40 from the groove portions 20a, 21a, and then, having the engagement levers 44, 46 in a disengaged state, the control adapter 10 is withdrawn from the control unit 12.

Accordingly, the user presses the press-maneuver parts 24, 25 to achieve the engagement mechanisms 54 in an engagement disengaged state, and withdraws the control adapter device 10 from the control unit 12, to thereby separate the engagement claws 38, 40 from the engagement holes 20, 21 and the inserting connector 30 from the receiving connector 22. As a result, the separation procedure of the control adapter device 10 from the control unit 12 is completed.

Next, an exemplary variation according to an embodiment of the present invention is described.

Figure 8:
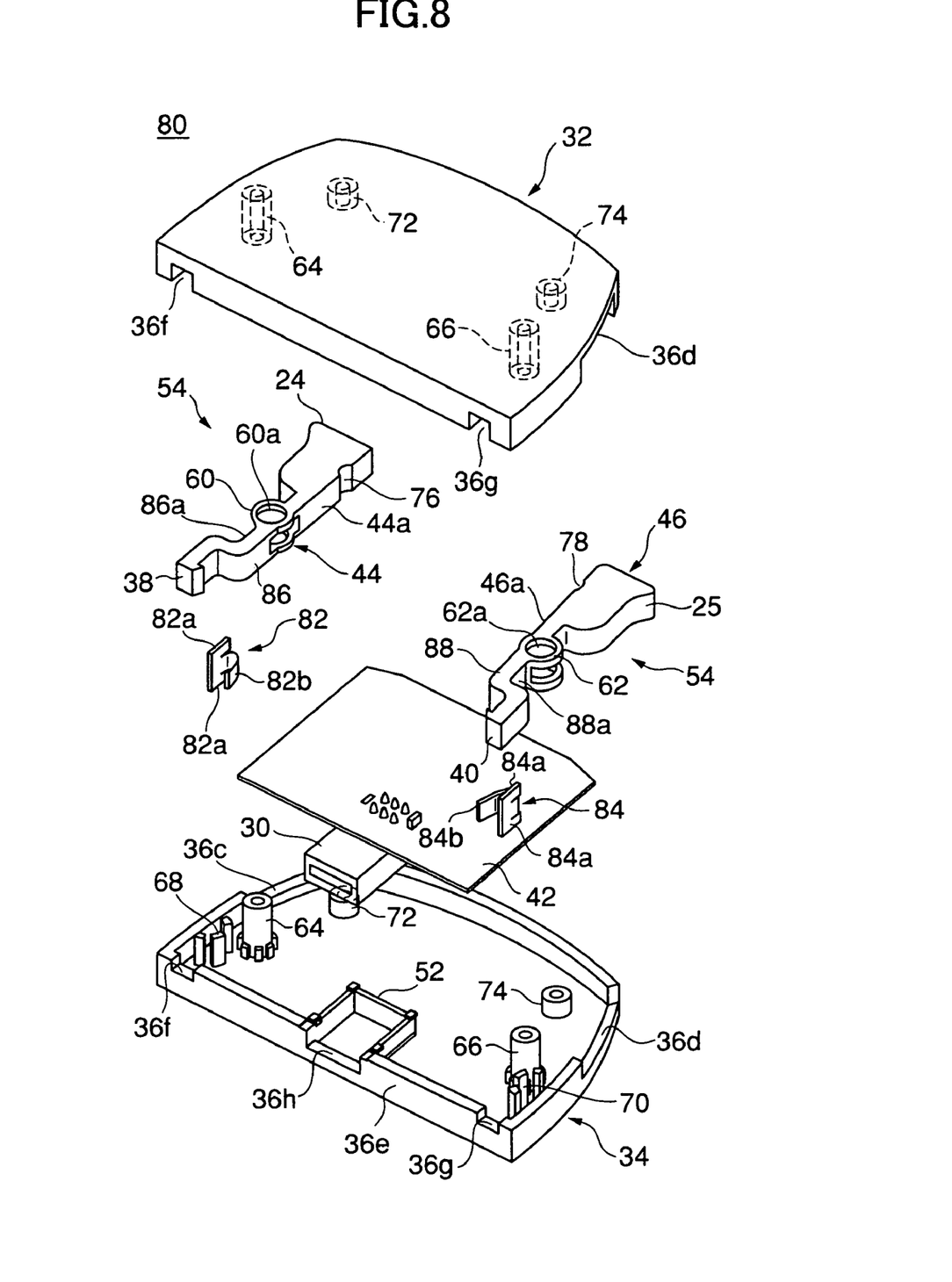
FIG. 8 is an exploded perspective view showing the structure of a control adapter device according to another embodiment of the present invention.
Figure 9:
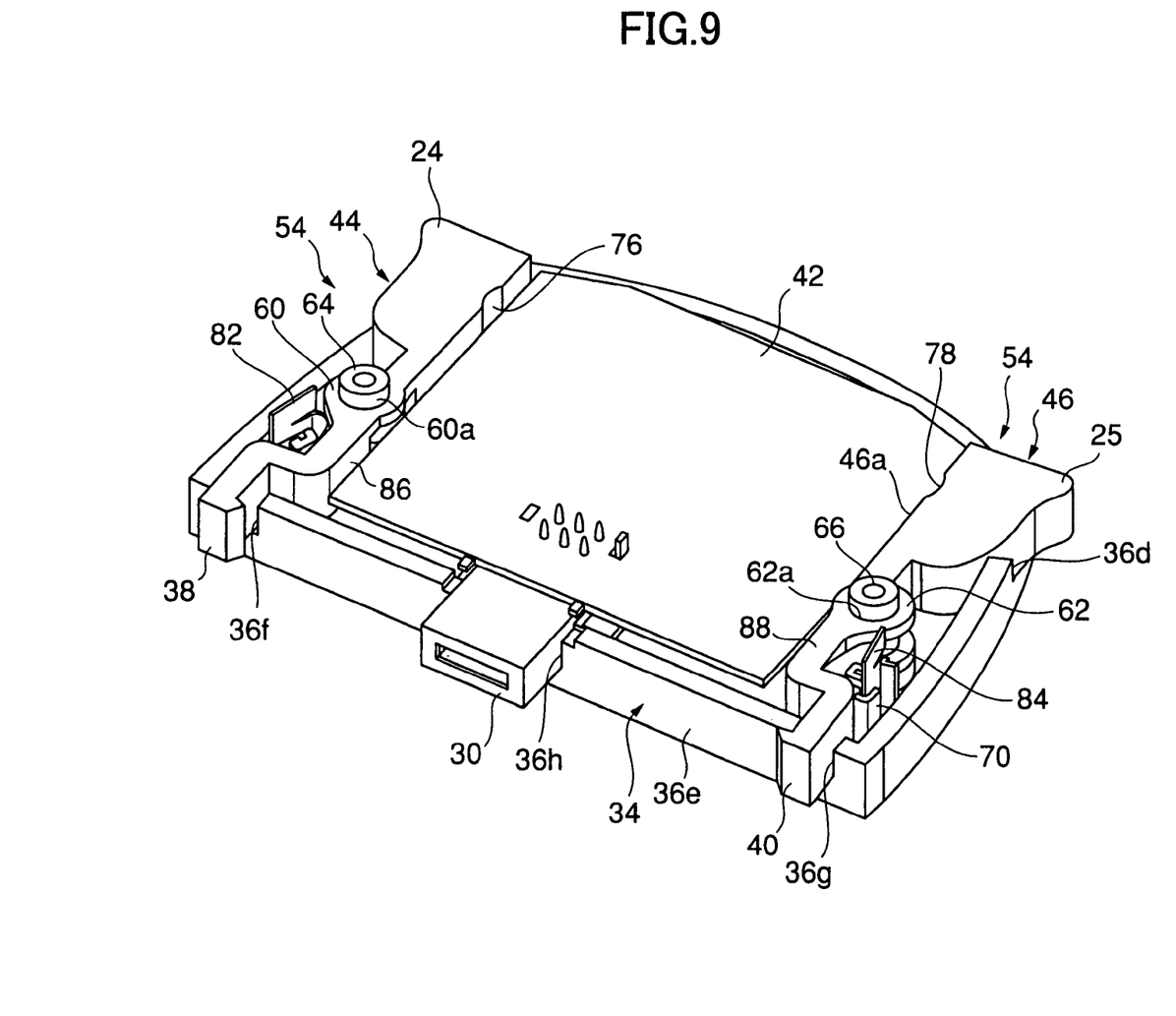
FIG. 9 is a perspective view showing an assembled state of the control adapter device of FIG. 8 where an upper case 32 is removed according to another embodiment of the present invention.

FIG. 8 is an exploded perspective view showing a structure of an exemplary variation of a control adapter device according to an embodiment of the present invention. FIG. 9 is a perspective view showing an assembled state where the upper case 32 is removed according to the exemplary variation. It is to be noted that like parts (components) in FIGS. 8 and 9 are denoted by like numerals as of the aforementioned embodiment and will not be further explained.

As shown in FIGS. 8 and 9, a control adapter 80 of the exemplary variation is provided with leaf springs 82, 84 instead of torsion springs 48, 50.

The leaf springs 82, 84 are disposed on the left and right in a symmetrical manner. One end portion 82a, 84a of the leaf springs 82, 84 is cut into a shape to be retained by the spring retaining portion 68, 70, respectively, and the other end portion 82b, 84b of the leaf springs 82, 84 is bent into an upside-down U-letter shape to contact with respective side surface 86a, 88a situated at the rear side of arm portions 86, 88 that support the engagement claws 38, 40. The leaf springs 82, 84, which are processed by bending of a spring material, urge the engagement levers 44, 46, respectively, toward an engagement position.

The leaf springs 82, 84, cooperate with the engagement levers 44, 46 in such a manner that the engagement levers 44, 46 are returnable to their engagement positions via the spring force of the respective springs. Moreover, the leaf springs 82, 84 require little installation space. Therefore, compact-sized engagement mechanisms 54 comprising the engagement levers 44, 46, and the leaf springs 82, 84, can be obtained.

Next, the operation of the engagement mechanism 54 of the exemplary variation of the control adapter device 80 and the mounting operation of the control adapter device 80 are described.

Figure 10:
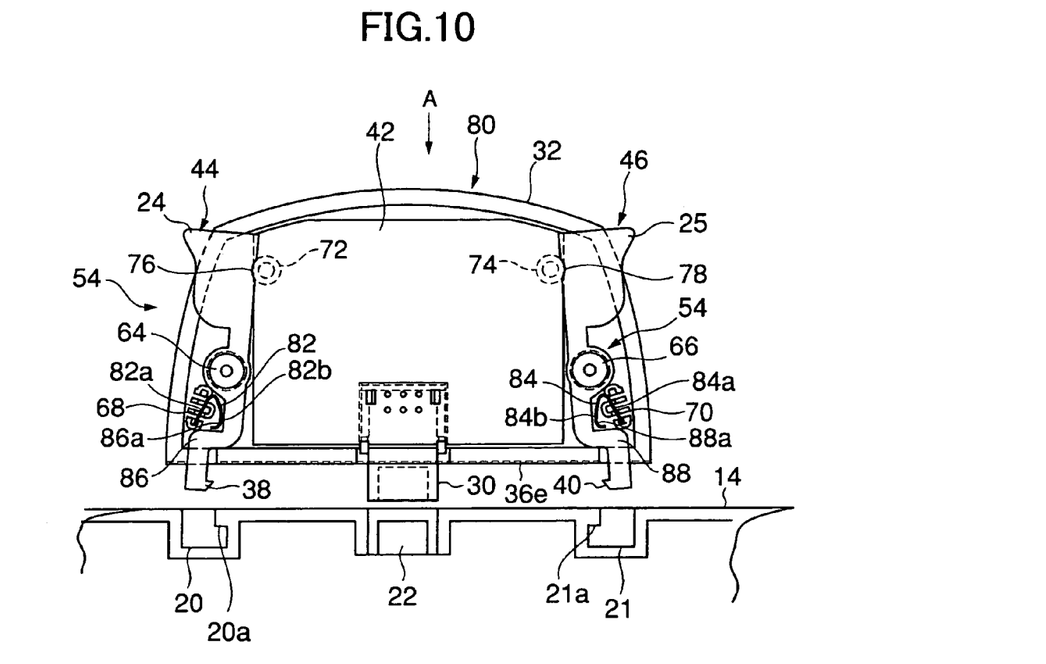
FIG. 10 is a side cross-sectional view showing a state before mounting a control adapter device 80 according to another embodiment of the present invention.

FIG. 10 is a side cross-sectional view showing a state before mounting the control adapter device 80.

As shown in FIG. 10, in mounting the control adapter 80 to the control unit 12, the press-maneuver parts 24, 25 are pressed from both left and right sides as in a squeezing manner. As a result, the engagement levers 44, 46 rotate in the engagement disengaging direction having the shafts 64, 66 serve as their respective centers.

The engagement levers 44, 46, which are biased against rotation by resisting the spring force of the leaf springs 82, 84, can be rotated to a position where the arcuate groove portions 76, 78 make contact against the stoppers 72, 74. This allows the engagement claws 38, 40, disposed at the tips of the engagement levers 44, 46, to be in a position ready for insertion into the engagement holes 20, 21, respectively, provided in the casing wall 14 of the control unit 12. The user can align the engagement claws 38, 40 with the engagement holes 20, 21, which also bring the inserting connector 30 into a position facing the receiving connector 22.

In such an operation, the engagement levers 44, 46 can be prevented from deforming (bending), and a satisfactory pressing feel can be obtained during an engagement disengaging maneuver, since the stoppers 72, 74 are situated at the vicinity of the line along which the pressing forces upon the press-maneuver parts 24, 25 are directed.

Subsequently, the user moves the control adapter device 80 toward the control unit 12 in direction A, thereby inserting the engagement claws 38, 40 into the engagement holes 20, 21, respectively, and the inserting connector 30 into the receiving connector 22.

Figure 11:
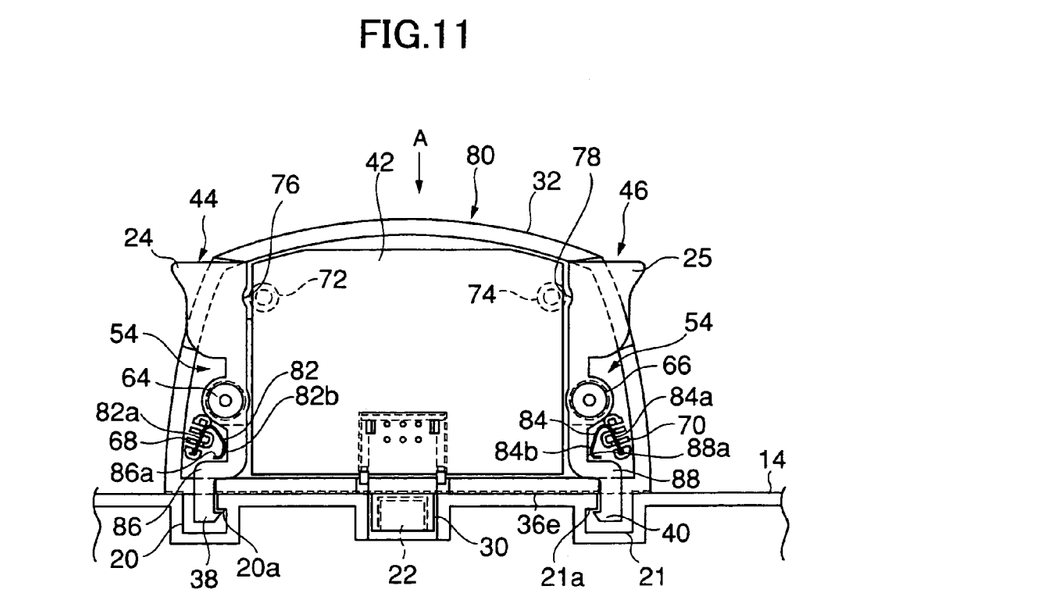
FIG. 11 is a side cross-sectional view showing a state after mounting the control adapter device 80 according to another embodiment of the present invention.

FIG. 11 is a side cross-sectional view showing a state after mounting the control adapter device 80 to the control unit 12. As shown in FIG. 11, when the rear surface 36e of the control adapter device 10 contacts the casing wall 14 of the control unit 12, the user can withdraw the force against the press-maneuver part 24, 25. As a result, the biasing force of the leaf springs 82, 84 urge the engagement levers 44, 46 to return to engaged positions.

Thus structured, the engagement claws 38, 40, disposed on the tips of the engagement levers 44, 46, contact in a lateral direction and engage groove portions 20a, 21a of the casing wall 14 that form part of the engagement hole 20, 21, respectively. Accordingly, the control adapter 10 is attached to the casing wall 14 of the control unit 12 where the inserting connector 30 is inserted to the receiving connector 22.

Although the foregoing embodiment has a pair of engagement mechanisms 54 disposed one on each the left and right sides of the control adapter device 10, the control adapter device of the present invention is not limited only to such an embodiment. For example, the engagement mechanism 54 may be disposed on only one of the sides of the control adapter device 10, 80.

Furthermore, although the foregoing embodiment has the inserting connector 30 disposed on the rear surface of the control adapter device 10, 80 the control adapter device of the present invention is not limited only to such an embodiment. For example, the receiving connector 22 may be disposed on the rear surface of the control adapter device 10, 80.

Furthermore, although the foregoing embodiment has a transmission circuit provided on the substrate 42, the control adapter device 10, 80 of the present invention is not to be limited only to such an embodiment. For example, a transmission circuit and a reception circuit may be provided on the substrate 42.

Further, the present invention is not limited to these embodiments, but various variations and modifications may be made without departing from the scope of the present invention.

The present application is based on Japanese Priority Application No. 2003-76506 filed on Mar. 19, 2003, with the Japanese Patent Office, the entire contents of which are hereby incorporated by reference.

What is claimed is:

1. A control adapter device for attaching to a control unit having an input control part, the control adapter device comprising:
    a connector for electrically connecting the control adapter device to the control unit;
    a transmission part for transmitting, by wireless transmission, a signal that is input from the input control part;
    a case supporting the connector and containing the transmission part therein;
    an engagement member being supported by a shaft in the case for rotatable movement between an engagement position and a disengagement position, the engagement member being formed to engage the control unit, and including a press-maneuver part for receiving a pressing force to thereby rotate the engagement member; and
    a restriction member being disposed in the case to block movement of the press maneuver part of the engagement member, and thereby restrict movement of the engagement member beyond the disengagement position.

2. The control adapter device as claimed in claim 1, wherein the restriction member is situated at the vicinity of a line along which the pressing force of the press-maneuver part is directed.

3. The control adapter device as claimed in claim 1, wherein the press-maneuver part has a groove portion in which a surface thereof comes into contact with the restriction member, and which groove portion has a shape corresponding to the shape of the restriction member.

* * * * *